US012792758B2

(12) United States Patent
Martinsson et al.

(10) Patent No.: US 12,792,758 B2
(45) Date of Patent: Nov. 10, 2026

(54) SYSTEMS AND METHODS FOR CLOUD-BASED DATABASE SYSTEM ACCOUNT MANAGEMENT OPERATIONS TRACKING

(71) Applicant: Salesforce, Inc., San Francisco, CA (US)

(72) Inventors: Lars Martinsson, Los Gatos, CA (US); John Joseph Jakubik, Austin, TX (US)

(73) Assignee: Salesforce, Inc., San Francisco, CA (US)

( * ) Notice: Subject to any disclaimer, the term of this patent is extended or adjusted under 35 U.S.C. 154(b) by 100 days.

(21) Appl. No.: 18/796,087

(22) Filed: Aug. 6, 2024

(65) Prior Publication Data

US 2026/0044616 A1 Feb. 12, 2026

(51) Int. Cl.
*G06F 21/62* (2013.01)

(52) U.S. Cl.
CPC .. *G06F 21/6218* (2013.01); *G06F 2221/2101* (2013.01); *G06F 2221/2113* (2013.01); *G06F 2221/2141* (2013.01)

(58) Field of Classification Search
CPC ......... G06F 21/6218; G06F 2221/2101; G06F 2221/2113; G06F 2221/2141
USPC .............................................................. 726/1
See application file for complete search history.

(56) References Cited

U.S. PATENT DOCUMENTS 10,911,564 B1 * 2/2021 Sarukkai ............... H04L 67/306
11,249,963 B2 2/2022 Martinsson
11,687,503 B2 6/2023 Martinsson
11,733,990 B2 8/2023 Martinsson
2021/0019683 A1 * 1/2021 Chappidi ......... G06Q 10/06393
2022/0191338 A1 * 6/2022 Oga .................... H04N 1/00514
2025/0094615 A1 * 3/2025 Blackwell ........... G06F 21/6218
2025/0175471 A1 * 5/2025 Muralidhar ............ G06Q 40/02

FOREIGN PATENT DOCUMENTS

CN 112930529 B 6/2021
EP 4022427 A1 7/2022
JP 2022545303 A 10/2022
WO 2021041646 A1 3/2021
WO WO-2024042354 A1 * 2/2024 ......... G06F 21/6218

* cited by examiner

*Primary Examiner* — Anthony D Brown
(74) *Attorney, Agent, or Firm* — Polygon IP, LLP

(57) ABSTRACT

A database system may include an account repository, a communication interface, a data model, an operation execution engine, and a record repository. The account repository may store account information for database system accounts including a first subset corresponding with users and a second subset corresponding with machine models. The communication interface may receive a message identifying an operation of the plurality of computing operations and a machine model of the plurality of machine models to perform the operation. The data model may include operation restriction information identifying one or more restrictions regarding database system accounts authorized to perform the operation. The operation execution engine may execute the machine model to perform the operation upon determining that the first account is authorized to assign the operation to a second account of the second subset of accounts corresponding to the machine model.

20 Claims, 8 Drawing Sheets

SYSTEMS AND METHODS FOR CLOUD-BASED DATABASE SYSTEM ACCOUNT MANAGEMENT OPERATIONS TRACKING

FIELD OF TECHNOLOGY

This patent application relates generally to database systems, and more specifically to database representations of operations performed via a computing system.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

One element of a cloud computing system is an on-demand database system. A database system may store various information about operations performed via a computing system. For instance, the database system may store database records reflecting the identity of accounts authorized to access the computing environment and/or the database system.

BRIEF DESCRIPTION OF THE DRAWINGS

The included drawings are for illustrative purposes and serve only to provide examples of possible structures and operations for the disclosed inventive systems, apparatus, methods, and computer program products for database representation of operations. These drawings in no way limit any changes in form and detail that may be made by one skilled in the art without departing from the spirit and scope of the disclosed implementations.

DETAILED DESCRIPTION

Figure 1:
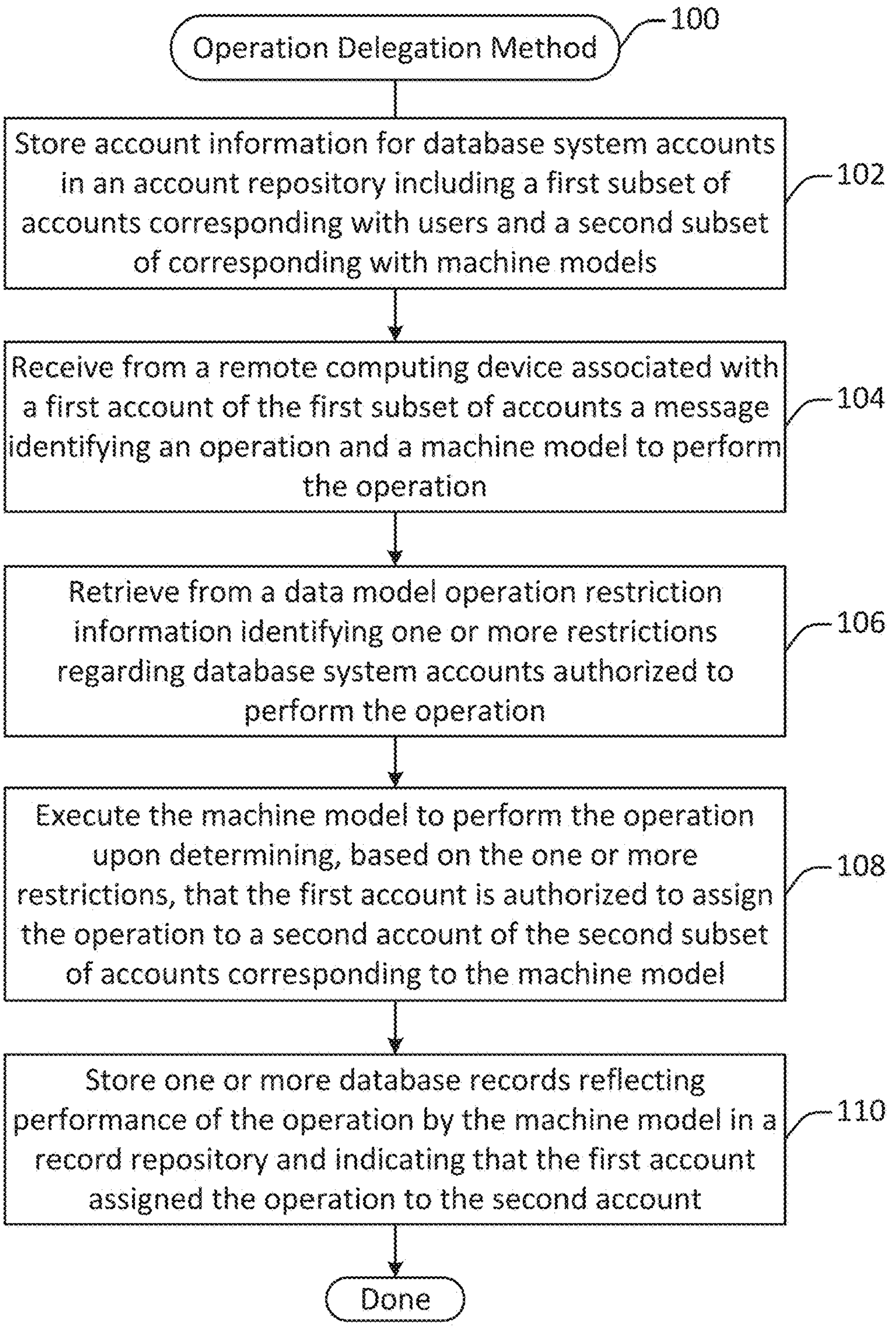
FIG. 1 illustrates an overview method, performed in accordance with one or more embodiments.

Techniques and mechanisms described herein provide for a database system configured so as to provide accountability when operations within a computing system may be completed by users and machine programs such as artificial intelligence models. According to various embodiments, a data model may define a task and associate a record of the task with an identity of a user, be it a human or a computing model, that completed the task. Such a data model may be used to reflect high-level decision making by an artificial intelligence model by recording that the model was used to approve, for example, a hiring, a compensation change, a partner discount, or other high-level decisions reflected in a database system. The data model may also be used to enforce one or more restrictions on tasks, for instance restricting which tasks can be performed by a machine, which tasks require human oversight, and which tasks can be delegated.

In some embodiments, a data model may be used to indicate which operations are permitted to be performed by an artificial intelligence model. For example, a sensitive decision may be identified as required to be performed by a human. Then, when a human user attempts to delegate the task to an artificial intelligence model, the system may reject the request.

According to various embodiments, techniques and mechanisms described herein may include a data model that supports recording information about accountability for operations performed via a computing system. For example, if an artificial intelligence model creates or updates data on behalf of a human user, the human user may be tracked as the authorizer of the changes. In a collaboration between a human and an artificial intelligence model, the artificial intelligence model may do much of the work. However, the human accountable for the work may still be tracked. For instance, the human who authorized or caused the artificial intelligence model to make the changes may be reflected in the database system.

According to various embodiments, a data model may support storing information that reflects responsibility and accountability for various operations performed via the computing services environment. These operations may include not only decisions but, more generally, various types of tasks, actions, and/or processes. Further, the data model may support a variety of accountability-related constructs such as recording both a party that authorized and/or caused a particular operation as well as a party that reviewed an operation. For instance, the data model may store information indicating that an email generated and sent via the computing services environment was written by an artificial intelligence model but was reviewed and approved by a particular human.

In some embodiments, a data model may support the storage of information about the artificial intelligence model responsible for a decision. For instance, the data model may store information such as the identity of the model, the version of the model, the fine tuning of a model, the model settings, the prompt, the prompt template, and/or other types of information associated with an artificial intelligence model. Such information may be used, for example, to audit a decision for the purposes of determining what went wrong. For instance, it may be determined that a particular model, model version, combination of settings, prompt, prompt template, or other configuration information leads to relatively better or worse performance.

In some implementations, a data model may support the storage of supporting information for an artificial intelligence model responsible for a decision. For example, information about a business operation associated with the execution of the artificial intelligence model may be stored. As another example, the system may store information about particular data sources, database records, input for retrieval augmented generation. As another example, for instance in the case of a decision regarding a loan application, the system may store information provided as input to the model, such as outstanding debt balances, marital status, primary house value, product purchase history, and the like. Such information may be stored within the computing system itself or may be retrieved from a remote system, such as one under control of a tenant organization.

In some implementations, the database system may store information about a business process that spans multiple systems. For instance, the data model may support information stored in a Responsible, Accountable, Supported, Consulted, and Informed (RASCI) matrix. Such information may move a human user from being Responsible for doing the work to Accountable for the work, and a machine user may be set as Responsible for doing for a task that the machine user has been authorized to do as part of being delegated access by a human.

In some embodiments, techniques and mechanisms described herein may facilitate regulatory compliance. For instance, the General Data Protection Regulation (GDPR) of the European Union provides for a "Right to Rectification", a right to "Accountability", and "Rights in relation to automated decision making and profiling" in situations where an artificial intelligence model made or recommended a decision that is impactful to a person. Frequently these rules are interpreted to include any form of profiling, such as work performance, health, interests, behavior, or location, that have legal ramifications. For instance, if a person's job status is changed due to any profiling, and particularly if an artificial intelligence model made such a decision without human intervention, then compliance with the GDPR may require one or more guardrails such as geography-based restriction and/or a requirement that such a task be completed or overseen by a human.

FIG. 1 illustrates an overview method 100 for delegating a task, performed in accordance with one or more embodiments. The overview method 100 may be performed at a computing environment such as the environment 200 shown in FIG. 2.

Account information for database system accounts is stored at 102 in an account repository. The account information includes a first subset of accounts corresponding with users and a second subset of accounts corresponding with machine models. For example, the machine models may be artificial intelligence models configured to perform one or more generative, predictive, decision, or classification tasks.

A message identifying an operation and a machine model to perform the operation is received at 104 from a remote computing device associated with a first device. In some embodiments, the message may be received via an application server. For instance, the message may identify a particular operation that includes one or more generative, predictive, decision, or classification elements. Additional details regarding the receipt and processing of such a message are discussed with respect to the method 400 shown in FIG. 4.

Operation restriction information identifying one or more restrictions regarding database system accounts authorized to perform the operation is retrieved from a data model at 106. According to various embodiments, the data model may identify operation-specific restrictions. The restrictions may indicate, for example, whether an operation can be delegated to a human, whether an operation can be delegated to a machine model, whether an operation must be reviewed by a human, and/or other such restrictions. Additional details regarding such a data model are discussed with respect to FIG. 3.

At 108, the machine model is executed to perform the operation upon determining, based on the one or more restrictions, that the first account is authorized to assign the operation to a second account of the second subset of accounts corresponding to the machine model. According to various embodiments, determining whether such assignment is authorized may involve evaluating the request against the one or more restrictions.

One or more database records reflecting performance of the operation by the machine model are stored in a record repository at 110. The one or more database records may indicate that the first account assigned the operation to the second account. Additional details regarding the execution of the operation and the storage of the database records are discussed with respect to the method 500 shown in FIG. 5.

According to various embodiments, as used herein, the term "operation" may refer to either a definition of an operation or an instance of an operation, depending on context. A single operation definition may potentially be associated with many instances of the operation.

Figure 2:
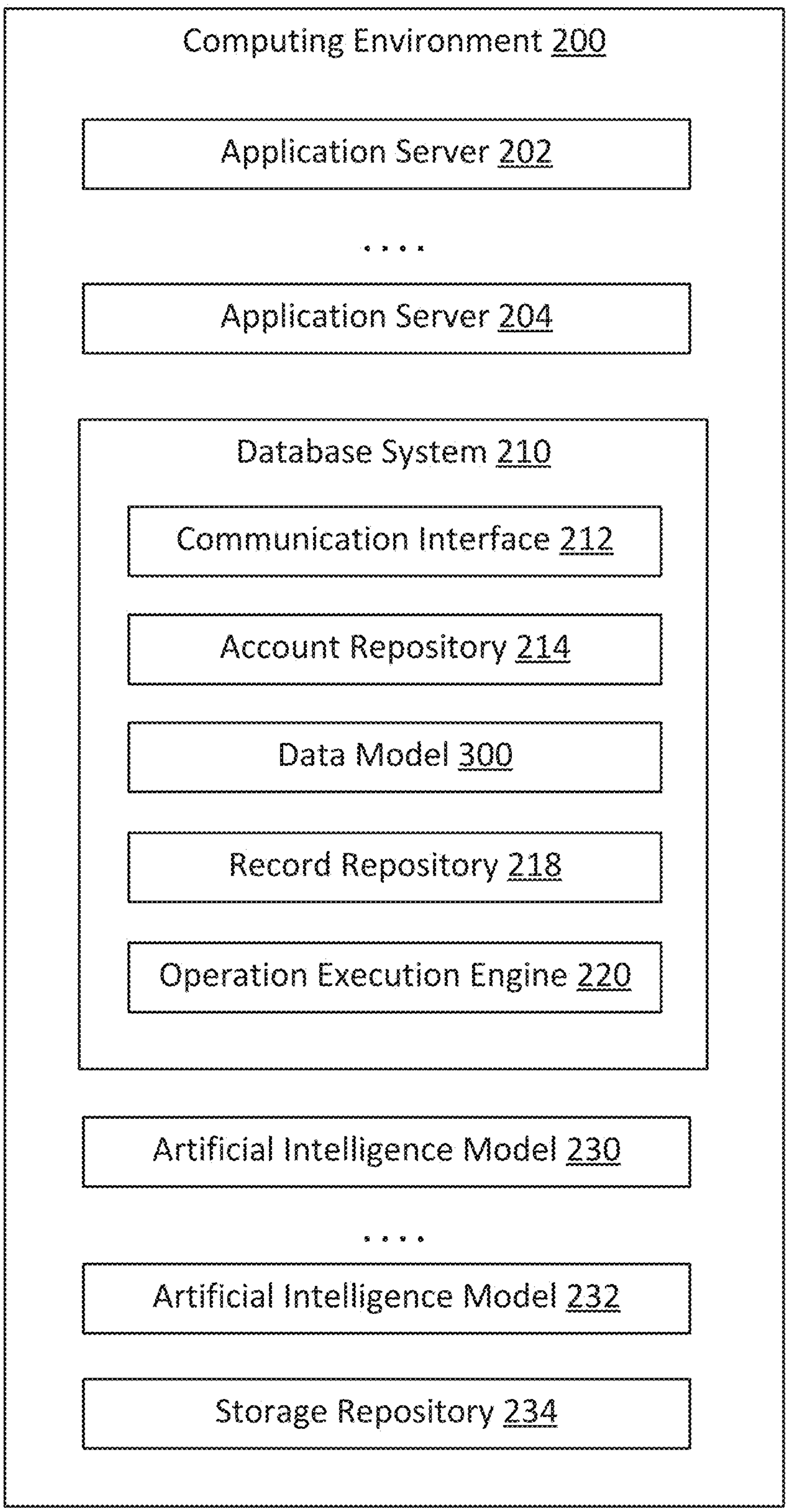
FIG. 2 is a diagram of a computing environment, provided in accordance with one or more embodiments.

FIG. 2 is a diagram of a computing environment 200, provided in accordance with one or more embodiments. The computing environment 200 includes one or more application servers 202 through 204 and a database system 210. The database system 210 includes a communication interface 212, an account repository 214, a data model 300, a record repository 218, an operation execution engine 220, artificial intelligence models 230 through 232, and a storage repository 234.

According to various embodiments, the application servers 202 through 204 may provide any of a variety of computing services to client machines accessing the computing environment 200 via the Internet. For example, the application servers 202 through 204 may provide computing services such as customer relations management services, sales services, data storage services, data analytics services, and the like.

In some embodiments, a computing service may be supported by the database system 210. The database system 210 may receive and respond to requests via the communication interface 212.

In some implementations, the account repository 214 may store information about accounts that are authorized to access the computing environment 200. The account repository 214 may store not only information about the accounts themselves, but also information identifying which data or portions of the computing environment 200 that an account is authorized to access.

In some embodiments, the record repository 218 may store database records related to the computing services provided via the application servers 202 through 204. The data model 300 may store metadata information characterizing the structure of information stored in the record repository 218. Additional details regarding the data model 216 are discussed with respect to FIG. 3.

In some configurations, the computing environment 200 may be implemented on shared infrastructure accessed by various entities. For instance, data stored in the database system 210 may include data associated with different tenants of a computing services provider. In other configurations, the computing environment 200 may be implemented on dedicated infrastructure accessible only by user accounts associated with a single entity such as a tenant of a computing services provider. Additional details about various configurations and additional components within a computing services environment are discussed throughout the application, for instance with respect to FIG. 6, FIG. 7A, FIG. 7B, and Figure C.

According to various embodiments, the operation execution engine 220 may be configured to facilitate executing any of various operations related to the computing environment 200. For example, the operation execution engine 220 may be configured to execute one or more operations that directly implicate the record repository 218, such as retrieving, storing, and/or updating one or more database records. As another example, the operation execution engine 220 may be configured to execute one or more operations that are performed elsewhere within the computing environment 200, such as at one of the artificial intelligence models 230 through 232.

According to various embodiments, one or more of the artificial intelligence models 230 through 232 may be executed directly within the computing environment 200. Alternatively, or additionally, one or more of the artificial intelligence models 230 through 232 may be executed outside the computing environment 200. For instance, one or more of the artificial intelligence models 230 through 232 may be executed on a remote computing system accessible via an artificial intelligence model gateway.

According to various embodiments, the information used to execute an artificial intelligence model may be stored in any of a variety of locations. For example, such information may be stored in the storage repository 234, retrieved from the database system 210, accessed from a remote storage location, or some combination thereof.

Figure 3:
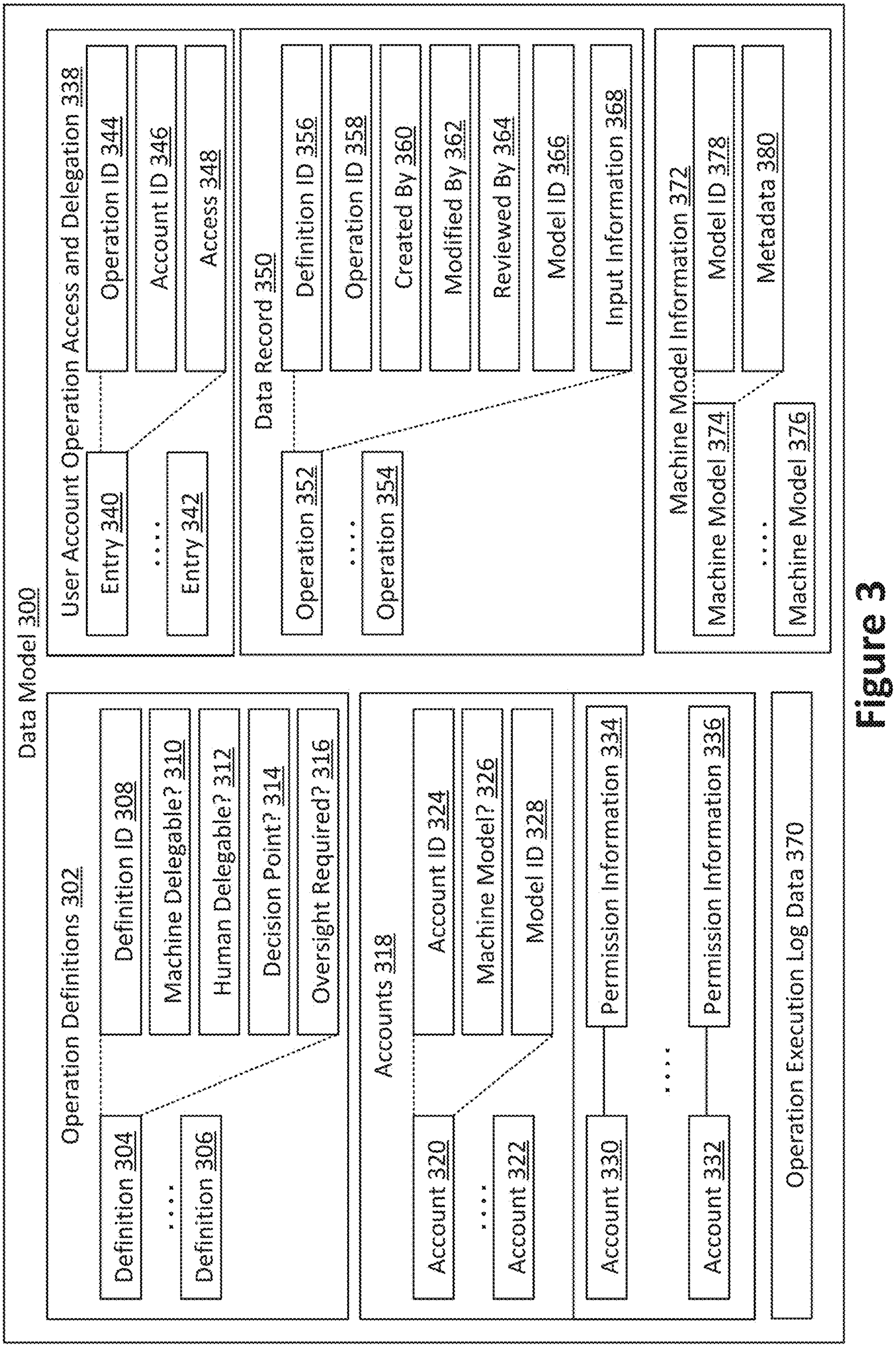
FIG. 3 is a diagram of a data model, configured in accordance with one or more embodiments.

FIG. 3 is a diagram of a data model 300, configured in accordance with one or more embodiments. The data model 300 may be provided so as to support decision making regarding operations performed via the computing environment 200.

The data model 300 includes operation definitions 302, accounts 318, user account operation access and delegation records 338, data records 350, operation execution log data 370, and machine model information 372.

The operation definitions 302 include definitions for various computing operations 304 through 306 that may be performed via the computing environment 200. According to various embodiments, a wide range of computing operations may be supported depending on the configuration of the computing environment 200. For example, computing operations may include, but are not limited to, those related to customer relations management, sales management, decision making, data analytics, database record access, database record storage, database record updating, artificial intelligence model execution, communication generation, and communication transmission. Additional details regarding the types of computing operations that may be supported are discussed with respect to FIG. 6, FIG. 7A, FIG. 7B, and FIG. 8.

In some embodiments, the operation definitions may be stored in a database table and may include various types of information characterizing the operations. For instance, an operation definition may include a definition ID 308 that uniquely identifies the definition. The operation definition may include various indicator fields. For example, the indicator fields may define whether the operation is delegable to a machine at 310, whether the operation is delegable to a human at 312, whether the operation corresponds to a decision at 314, whether oversight of the decision is required at 316 if the operation is delegated, and/or any other types of information.

In some embodiments, an operation definition may include information other than that shown in FIG. 3. For instance, an operation definition may include information identifying an operation type, a context in which the operation is performed, one or more database record types implicated by the operation, and/or any other relevant information.

The account repository 318 stores information about database system accounts 320 through 322 authorized to access the database system. Each account may be associated with information such as a unique database system account identifier 324.

In some embodiments, an account may also be associated with an indicator field 326 indicating whether the account corresponds to a machine model. As discussed herein, a machine model may be identified in the database system by a database system account. In this way, the database system may track the performance of computing operations by human users and by machine models.

In some embodiments, an account identified as a machine model may be associated with a model ID 328 that uniquely identifies the machine model. In this way, a machine model may be uniquely identified within the database system while potentially being associated with multiple database system accounts. Such a configuration may, for instance, allow a database system account to be switched from one machine model to a different machine model.

According to various embodiments, an account may be associated with other account data. In the case of a human user, the other account data may include, for instance, information characterizing the human user, such as the user's name, contact information, organizational role, and the like.

In some embodiments, an account may be associated with permission information 334 through 336. The permission information may indicate, for instance, types of database records or computing operations accessible to the database system account.

According to various embodiments, the user account operation access and delegation information 338 may include entries 340 through 342 reflecting various types of record access. For instance, an entry 340 may identify an operation ID 344 that uniquely identifies an instance of an operation. The entry 340 also includes an Account ID 346 that uniquely identifies a user account that has access to the record. The entry 340 also includes access information 348 identifying the type of access that has been granted. For example, the access information 348 may indicate that the account ID 346 has been delegated the operation instance associated with the operation ID 344.

The data records 350 may include records reflecting the execution of operation instance 352 through 354. Each operation instance record may be associated with field values indicating information about the performance of the operation instance. A definition identifier 356 may uniquely identify the operation definition associated with the operation instance. An operation identifier 358 may uniquely identify the operation instance itself.

According to various embodiments, the data records 350 may include many other records beyond those illustrated in FIG. 3. For example, as discussed with respect to FIG. 6, FIG. 7A, and FIG. 7B, the database system may store various types of information related to the computing services provided. Such information may include, but is not limited to, database records pertaining to customer relations management data, sales data, communications data, and the like.

According to various embodiments, the fields 360, 362, and 364 may identify the database system accounts that created, modified, and reviewed or approved the operation instance. Such fields may also be associated with date information indicating when the operation instance was created, modified, and reviewed or approved.

In some implementations, an operation instance may be associated with a model identifier 366 that uniquely identifies a machine model, such as an artificial intelligence model, used to perform the operation instance. The operation instance record may also include input information 368 that characterizes the configuration of the machine model. For instance, the database system may store information such as a prompt, a prompt template, data values, and other such information used to configure a machine learning or artificial intelligence model for execution.

In some embodiments, the machine model information 372 may store information characterizing the machine models 374 through 376. For example, a machine model may be associated with a model ID 378 that uniquely identifies the machine model as well as metadata 380. The model metadata 380 may include information such as model version, model source, model access information, and model configuration parameters.

According to various embodiments, the data model 300 supports flexibly configuring artificial intelligence models as database system accounts. For example, the same database system account may be associated with different machine models over time. As another example, the same machine model configuration may be associated with multiple database system accounts. As yet another example, the same machine model may be configured in different ways for different database system accounts. Various combinations are possible.

According to various embodiments, the operation execution log data 370 stores granular information characterizing the execution of operations by artificial intelligence models. For example, the operation execution log data 370 may store information such as prompts, prompt templates, tuning parameters, random seeds, and other configuration data associated with the execution of generative language models. As another example, the operation execution log data 370 may store information such as data observations provided to machine learning classification or prediction models. Collectively, the operation execution log data 370 may be used, in some configurations, to reproduce the execution of an artificial intelligence model used to perform a computing operation.

According to various embodiments, information included in the data model 300 may be specific to a particular tenant. For example, as discussed herein, various tenant organizations may access computing services provided by the service provider of the computing environment 200. These different tenants may have different data, metadata, and configuration information stored in the database system. For instance, different tenants may be associated with different data records, accounts, operation definitions, and the like.

Figure 4:
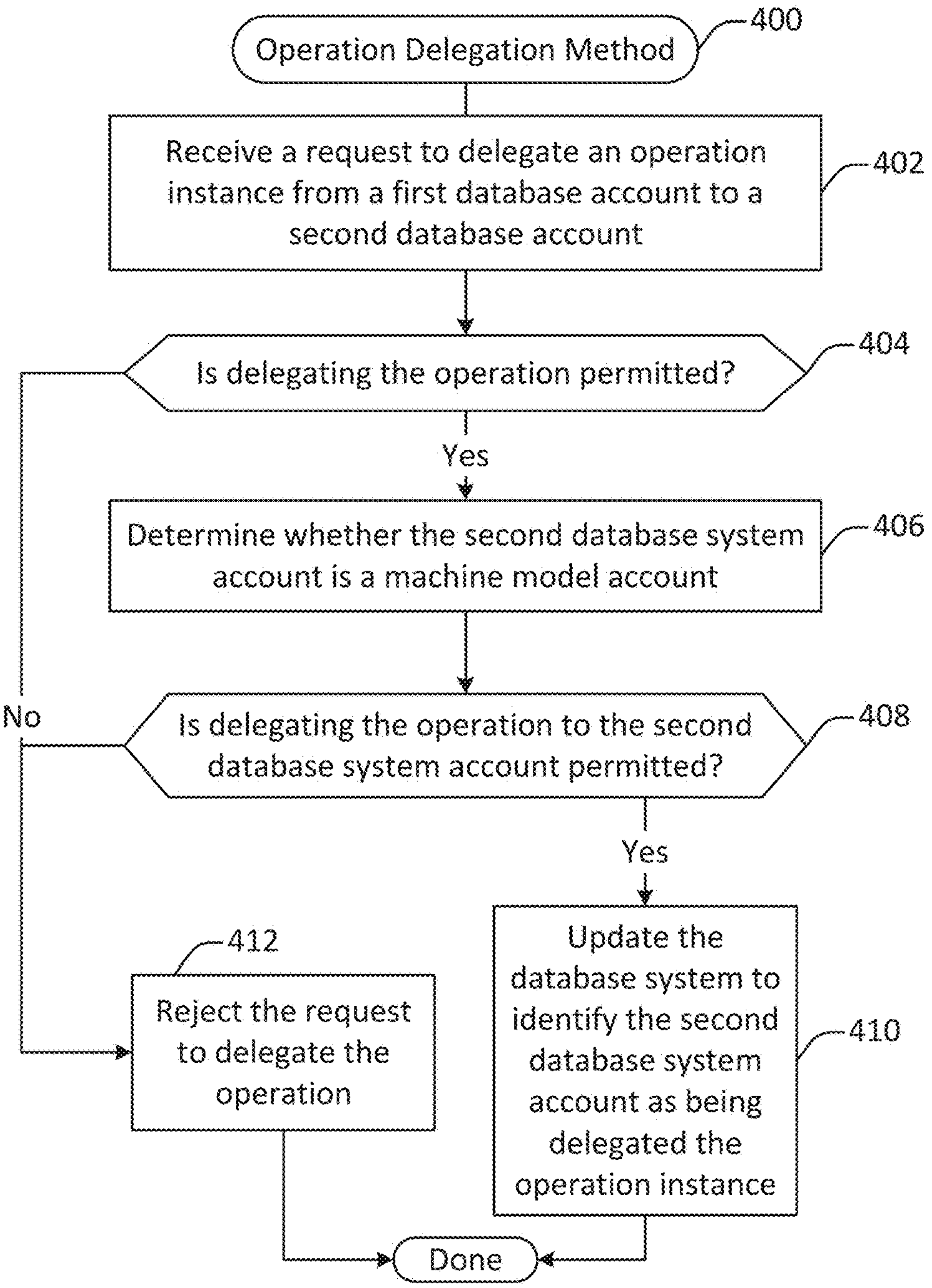
FIG. 4 illustrates a method of delegating a task, performed in accordance with one or more embodiments.

FIG. 4 illustrates a method 400 of delegating an operation, performed in accordance with one or more embodiments. In some embodiments, the method 400 may be performed at the computing environment 200 shown in FIG. 2.

A request to delegate an operation instance from a first database account to a second database account is received at 402. According to various embodiments, the operation may be any instance of an operation defined based on an operation definition as discussed with respect to FIG. 3. For instance, the operation may be associated with a data record such as the data record 352.

In some embodiments, the request may be received at an application server such as the application server 202 shown in FIG. 2. For instance, the application server 202 may provide access to a web interface configured to receive user input associated with the delegation of tasks.

A determination is made at 404 as to whether delegating the operation is permitted. Upon determining that delegating the operation is permitted, a determination is made at 406 as to whether the second database system account is a machine model account. Upon determining that delegation is permitted, a determination is made at 406 as to whether the second database system account is a machine model account. Then, at 408, a determination is made as to whether delegating the operation to the second database account is permitted.

According to various embodiments, some or all of the determinations made at operations 404 through 408 may be made based on an operation definition 304 associated with the operation instance identified at 402, permission information associated with an account, and/or other types of information reflected in the data model 300.

Upon determining that delegation of the operation to the second database system account is permitted, then the database system is updated at 410 to identify the second database system account as being delegated the operation instance. For example, a data record 340 may be updated to reflect that the user ID associated with the second database system account has been delegated the operation instance.

Upon determining instead that delegating the operation to the second database system account is not permitted, then the request to delegate the operation is rejected at 412. In some embodiments, rejecting the request may involve transmitting a message, for instance to the requestor, indicating that the request has been rejected.

Figure 5:
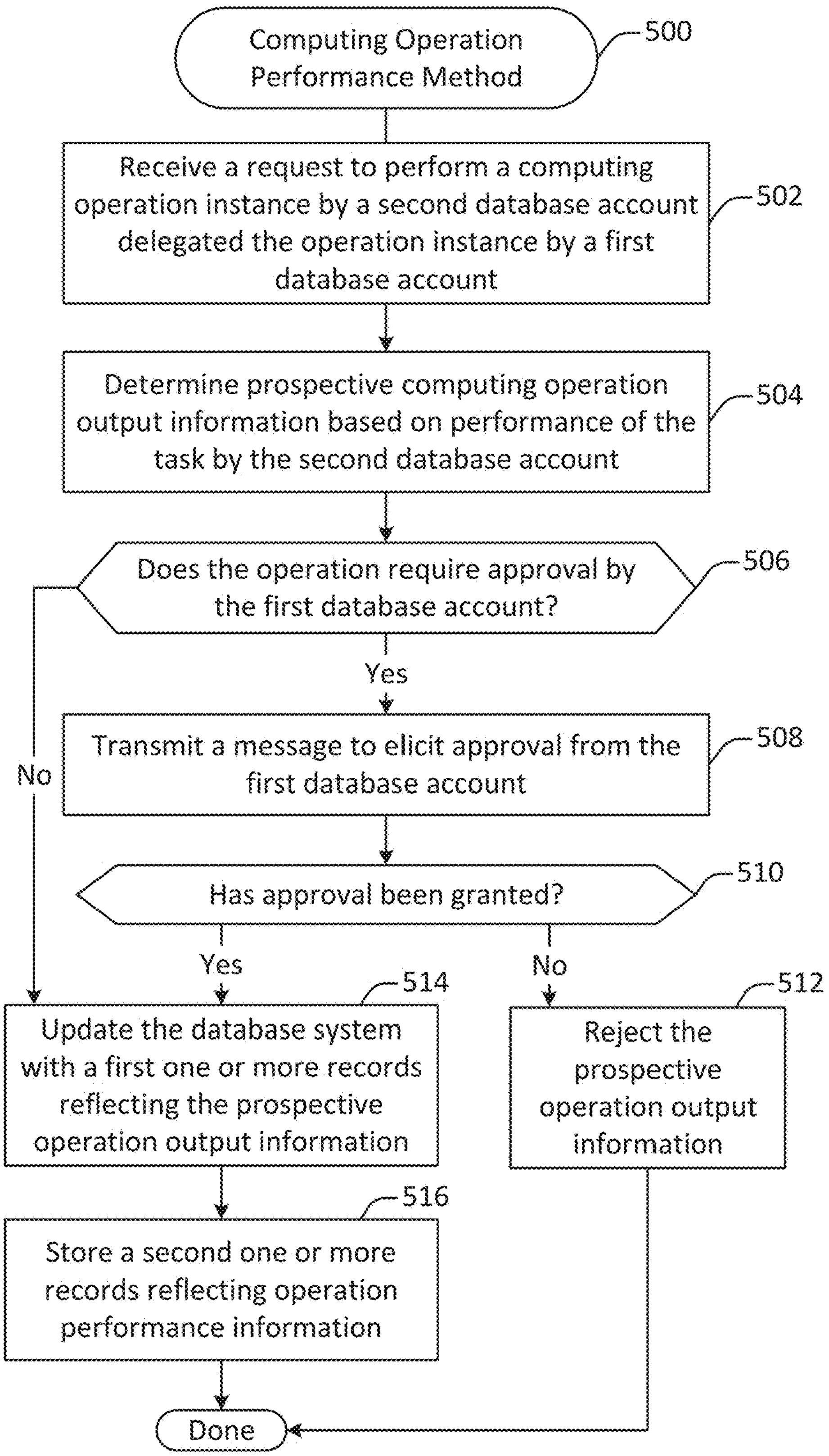
FIG. 5 illustrates a method of performing a task, performed in accordance with one or more embodiments.

FIG. 5 illustrates a method 500 of performing a computing operation, performed in accordance with one or more embodiments. According to various embodiments, the method 500 may be performed at a computing environment such as the computing environment 200 shown in FIG. 2.

A request to perform a computing operation instance is received at 502. The request may identify the performer of the operation as a second database account delegated the operation by the first database account. In some embodiments, the request may be generated based on a message received from a remote computing device, for instance as discussed with respect to the operation 104 shown in FIG. 1. Alternatively, or additionally, the request may be generated as part of a workflow, which may be triggered based on such a message. For instance, the request may be received from an application server.

In some implementations, the request received at 502 may be generated automatically upon delegation of a computing operation as discussed with respect to the method 400 shown in FIG. 4. Alternatively, a triggering condition may need to be detected before such a request is generated.

According to various embodiments, the request may identify any of a variety of operations capable of being performed via the computing environment. For instance, the operation may involve making a decision, making a prediction, classifying or otherwise analyzing data, transmitting a communication, storing a database record, accessing a database record, updating a database record, and/or any other type of computing operation.

Prospective operation output information is determined at 504 based on performance of the task by the second database account. According to various embodiments, the prospective operation output information may include data that is generated by executing the operation but that is not yet reflected in the database system.

In some embodiments, the second database account may correspond to a machine model. In such a situation, the output information may include output data determined by executing the machine model to perform the operation.

In some embodiments, the second database account may correspond to a human user of the database system. In such a situation, the output information may include data determined based on user input.

A determination is made at 508 as to whether to elicit approval from the first database account before recording the prospective output information. In some embodiments, the determination may be made based on accessing the data model 300 shown in FIG. 3. For instance, the determination may be made by accessing definition information associated with the operation.

Upon determining that the operation requires approval by the first database account, a message to elicit approval from the first database account is transmitted at 508. In some embodiments, the first database account may correspond to a human user. In such a situation, the message may be sent via email, web interface, messaging application, or any suitable communication channel.

In some embodiments, the first database account may correspond to a machine user. In such a situation, sending the message may involve executing a machine model with appropriate input.

In some implementations, the message sent at 508 may include some or all of the prospective operation output information determined at 504. Alternatively, such information may be accessed by the recipient via the computing environment 200.

A determination is made at 510 as to whether approval has been granted. In some embodiments, the determination may involve waiting for an explicit indication of approval or disapproval. Alternatively, approval may be assumed to have been granted or denied after the passage of a designated period of time.

According to various embodiments, the manner in which approval is granted or denied may depend on considerations such as the nature of the first database account (human vs. machine model) and the nature in which the approval is elicited. For instance, approval or disapproval may be indicated via a message sent via a suitable communication channel, which may be an email, an application procedure interface call, a messaging interface, or another type of channel.

Upon determining that approval has been denied, then at 512 the prospective operation output information is rejected. According to various embodiments, rejecting the prospective operation output information may involve one or more operations such as transmitting a response message to one or more database accounts, requesting that the operation be performed again, and/or storing information reflecting the failed operation in the database system.

Upon determining instead that approval has been granted or that no approval is needed, the database system is updated at 514 with a first one or more records reflecting the prospective operation output information. For instance, one or more database records may be added or updated to include the prospective operation output information.

At 516, a second one or more records are stored reflecting operation performance information. For instance, the second one or more records may indicate that the operation was performed by the second database account. Optionally, the second one or more records may indicate that the operation was reviewed and approved by the first database account.

Figure 6:
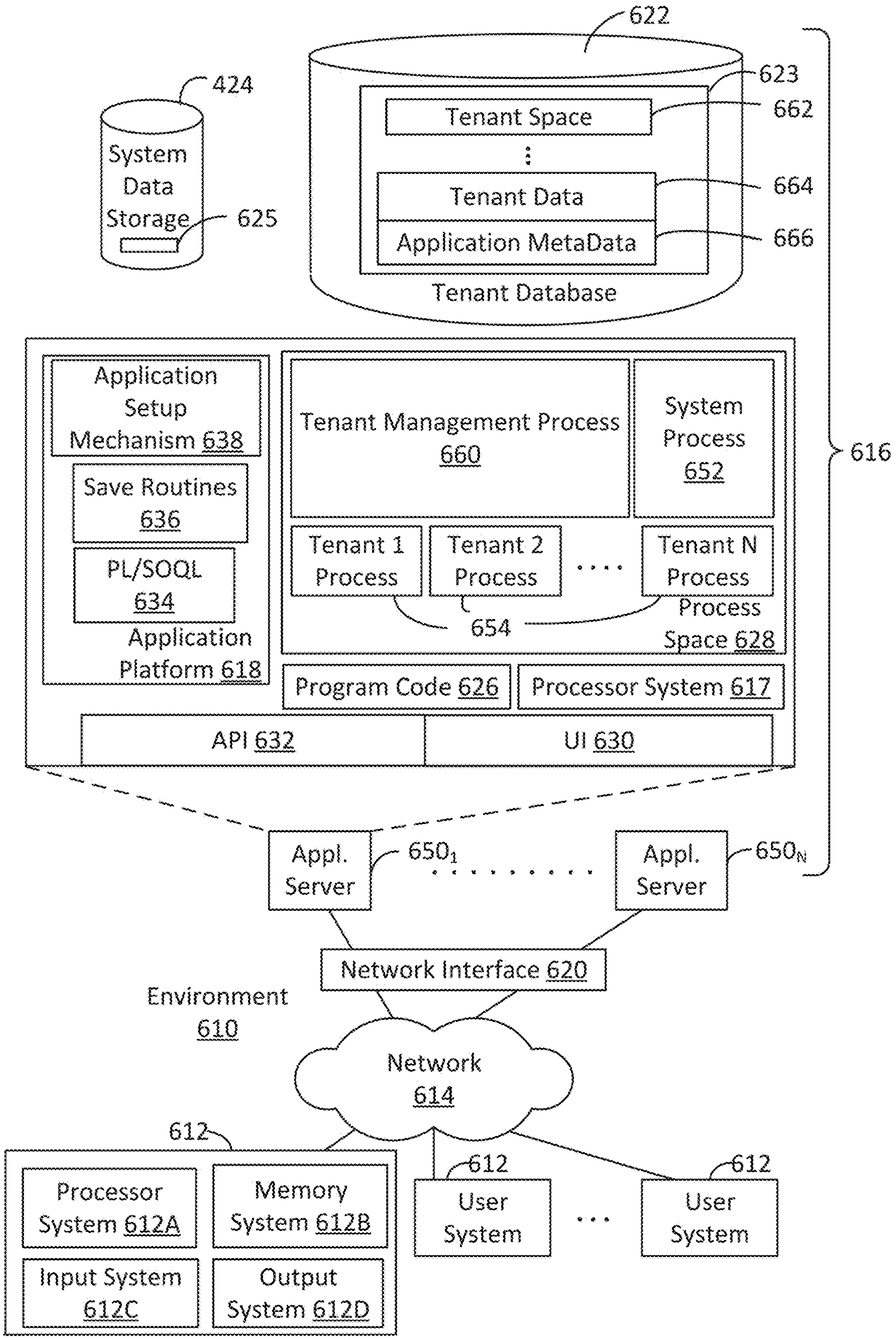
FIG. 6 shows a block diagram of an example of an environment that includes an on-demand database service configured in accordance with some implementations.

FIG. 6 shows a block diagram of an example of an environment 610 that includes an on-demand database service configured in accordance with some implementations. Environment 610 may include user systems 612, network 614, database system 616, processor system 617, application platform 618, network interface 620, tenant data storage 622, tenant data 623, system data storage 624, system data 625, program code 626, process space 628, User Interface (UI) 630, Application Program Interface (API) 632, PL/SOQL 634, save routines 636, application setup mechanism 638, application servers 650-1 through 650-N, system process space 652, tenant process spaces 654, tenant management process space 660, tenant storage space 662, user storage 664, and application metadata 666. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 616, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 618 may be a framework that allows the creation, management, and execution of applications in system 616. Such applications may be developed by the database service provider or by users or third-party application developers accessing the service. Application platform 618 includes an application setup mechanism 638 that supports application developers' creation and management of applications, which may be saved as metadata into tenant data storage 622 by save routines 636 for execution by subscribers as one or more tenant process spaces 654 managed by tenant management process 660 for example. Invocations to such applications may be coded using PL/SOQL 634 that provides a programming language style interface extension to API 632. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 666 for a subscriber making such an invocation. Such system processes may also manage execution of application metadata 666 as an application in a virtual machine.

In some implementations, each application server 650 may handle requests for any user associated with any organization. A load balancing function (e.g., an F5 Big-IP load balancer) may distribute requests to the application servers 650 based on an algorithm such as least-connections, round robin, observed response time, etc. Each application server 650 may be configured to communicate with tenant data storage 622 and the tenant data 623 therein, and system data storage 624 and the system data 625 therein to serve requests of user systems 612. The tenant data 623 may be divided into individual tenant storage spaces 662, which can be either a physical arrangement and/or a logical arrangement of data. Within each tenant storage space 662, user storage 664 and application metadata 666 may be similarly allocated for each user. For example, a copy of a user's most recently used (MRU) items might be stored to user storage 664. Similarly, a copy of MRU items for an entire tenant organization may be stored to tenant storage space 662. A UI 630 provides a user interface and an API 632 provides an application programming interface to system 616 resident processes to users and/or developers at user systems 612.

System 616 may implement a web-based database management system. For example, in some implementations, system 616 may include application servers configured to implement and execute database-related software applications. The application servers may be configured to provide related data, code, forms, web pages and other information to and from user systems 612. Additionally, the application servers may be configured to store information to, and retrieve information from a database system. Such information may include related data, objects, and/or Webpage content. With a multi-tenant system, data for multiple tenants may be stored in the same physical database object in tenant data storage 622, however, tenant data may be arranged in the storage medium(s) of tenant data storage 622 so that data of one tenant is kept logically separate from that of other tenants. In such a scheme, one tenant may not access another tenant's data, unless such data is expressly shared.

Several elements in the system shown in FIG. 6 include conventional, well-known elements that are explained only briefly here. For example, user system 612 may include processor system 612A, memory system 612B, input system 612C, and output system 612D. A user system 612 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 612 to access, process and view information, pages and applications available from system 616 over network 614. Network 614 may be any network or combination of networks of devices that communicate with one another, such as any one or any combination of a LAN (local area network), WAN (wide area network), wireless network, or other appropriate configuration.

The users of user systems 612 may differ in their respective capacities, and the capacity of a particular user system 612 to access information may be determined at least in part by "permissions" of the particular user system 612. As discussed herein, permissions generally govern access to computing resources such as data objects, components, and other entities of a computing system, such as an on-demand database system, a social networking system, and/or a CRM database system. "Permission sets" generally refer to groups of permissions that may be assigned to users of such a computing environment. For instance, the assignments of users and permission sets may be stored in one or more databases of System 616. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 616 may provide on-demand database service to user systems 612 using an MTS arrangement. By way of example, one tenant organization may be a company that employs a sales force where each salesperson uses system 616 to manage their sales process. Thus, a user in such an organization may maintain contact data, leads data, customer follow-up data, performance data, goals and progress data, etc., all applicable to that user's personal sales process (e.g., in tenant data storage 622). In this arrangement, a user may manage his or her sales efforts and cycles from a variety of devices, since relevant data and applications to interact with (e.g., access, view, modify, report, transmit, calculate, etc.) such data may be maintained and accessed by any user system 612 having network access.

When implemented in an MTS arrangement, system 616 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 616 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 616 may also maintain system-level data usable by multiple tenants or other data. Such system-level data may include industry reports, news, postings, and the like that are sharable between tenant organizations.

In some implementations, user systems 612 may be client systems communicating with application servers 650 to request and update system-level and tenant-level data from system 616. By way of example, user systems 612 may send one or more queries requesting data of a database maintained in tenant data storage 622 and/or system data storage 624. An application server 650 of system 616 may automatically generate one or more SQL statements (e.g., one or more SQL queries) that are designed to access the requested data. System data storage 624 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 7A:
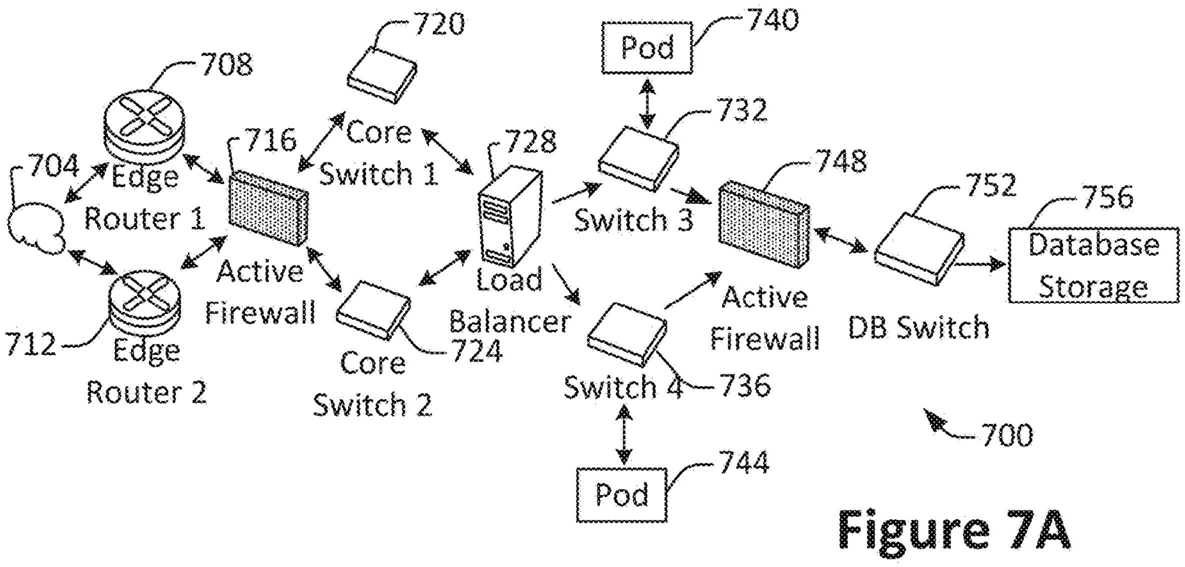
FIG. 7A shows a system diagram of an example of architectural components of an on-demand database service environment, configured in accordance with some implementations.

FIG. 7A shows a system diagram of an example of architectural components of an on-demand database service environment 700, configured in accordance with some implementations. A client machine located in the cloud 704 may communicate with the on-demand database service environment via one or more edge routers 708 and 712. A client machine may include any of the examples of user systems 612 described above. The edge routers 708 and 712 may communicate with one or more core switches 720 and 724 via firewall 716. The core switches may communicate with a load balancer 728, which may distribute server load over different pods, such as the pods 740 and 744 by communication via pod switches 732 and 736. The pods 740 and 744, which may each include one or more servers and/or other computing resources, may perform data processing and other operations used to provide on-demand services. Components of the environment may communicate with a database storage 756 via a database firewall 748 and a database switch 752.

Accessing an on-demand database service environment may involve communications transmitted among a variety of different components. The environment 700 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 7A and 7B.

The cloud 704 refers to any suitable data network or combination of data networks, which may include the Internet. Client machines located in the cloud 704 may communicate with the on-demand database service environment 700 to access services provided by the on-demand database service environment 700. By way of example, client machines may access the on-demand database service environment 700 to retrieve, store, edit, and/or process database access information.

In some implementations, the edge routers 708 and 712 route packets between the cloud 704 and other components of the on-demand database service environment 700. The edge routers 708 and 712 may employ the Border Gateway Protocol (BGP). The edge routers 708 and 712 may maintain a table of IP networks or 'prefixes', which designate network reachability among autonomous systems on the internet.

In one or more implementations, the firewall 716 may protect the inner components of the environment 700 from internet traffic. The firewall 716 may block, permit, or deny access to the inner components of the on-demand database service environment 700 based upon a set of rules and/or other criteria. The firewall 716 may act as one or more of a packet filter, an application gateway, a stateful filter, a proxy server, or any other type of firewall.

In some implementations, the core switches 720 and 724 may be high-capacity switches that transfer packets within the environment 700. The core switches 720 and 724 may be configured as network bridges that quickly route data between different components within the on-demand database service environment. The use of two or more core switches 720 and 724 may provide redundancy and/or reduced latency.

In some implementations, communication between the pods 740 and 744 may be conducted via the pod switches 732 and 736. The pod switches 732 and 736 may facilitate communication between the pods 740 and 744 and client machines, for example via core switches 720 and 724. Also or alternatively, the pod switches 732 and 736 may facilitate communication between the pods 740 and 744 and the database storage 756. The load balancer 728 may distribute workload between the pods, which may assist in improving the use of resources, increasing throughput, reducing response times, and/or reducing overhead. The load balancer 728 may include multilayer switches to analyze and forward traffic.

In some implementations, access to the database storage 756 may be guarded by a database firewall 748, which may act as a computer application firewall operating at the database application layer of a protocol stack. The database firewall 748 may protect the database storage 756 from application attacks such as structure query language (SQL) injection, database rootkits, and unauthorized information disclosure. The database firewall 748 may include a host using one or more forms of reverse proxy services to proxy traffic before passing it to a gateway router and/or may inspect the contents of database traffic and block certain content or database requests. The database firewall 748 may work on the SQL application level atop the TCP/IP stack, managing applications' connection to the database or SQL management interfaces as well as intercepting and enforcing packets traveling to or from a database network or application interface.

In some implementations, the database storage 756 may be an on-demand database system shared by many different organizations. The on-demand database service may employ a single-tenant approach, a multi-tenant approach, a virtualized approach, or any other type of database approach. Communication with the database storage 756 may be conducted via the database switch 752. The database storage 756 may include various software components for handling database queries. Accordingly, the database switch 752 may direct database queries transmitted by other components of the environment (e.g., the pods 740 and 744) to the correct components within the database storage 756.

Figure 7B:
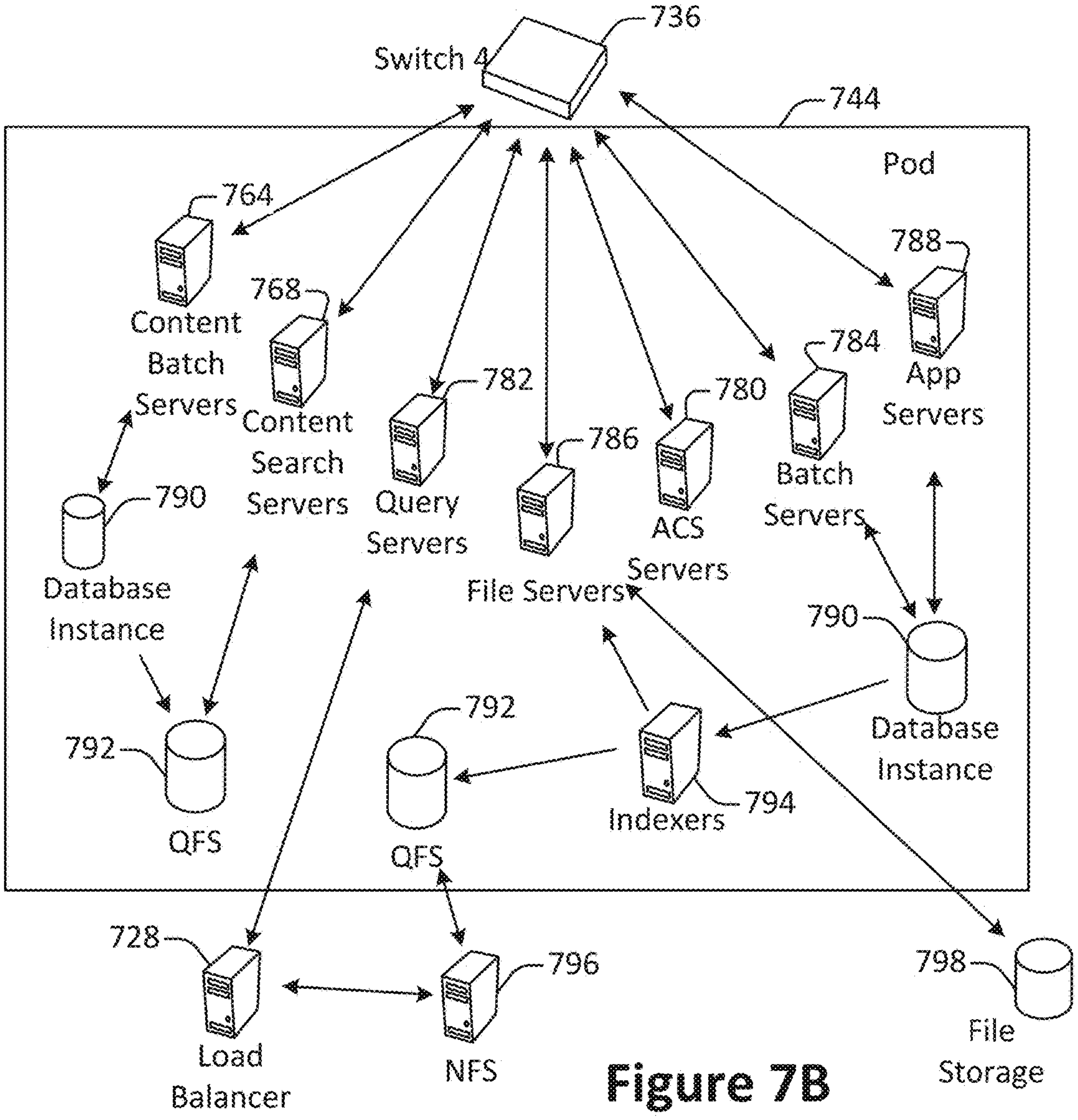
FIG. 7B shows a system diagram further illustrating an example of architectural components of an on-demand database service environment, in accordance with some implementations.

FIG. 7B shows a system diagram further illustrating an example of architectural components of an on-demand database service environment, in accordance with some implementations. The pod 744 may be used to render services to user(s) of the on-demand database service environment 700. The pod 744 may include one or more content batch servers 764, content search servers 768, query servers 782, file servers 786, access control system (ACS) servers 780, batch servers 784, and app servers 788. Also, the pod 744 may include database instances 790, quick file systems (QFS) 792, and indexers 794. Some or all communication between the servers in the pod 744 may be transmitted via the switch 736.

In some implementations, the app servers 788 may include a framework dedicated to the execution of procedures (e.g., programs, routines, scripts) for supporting the construction of applications provided by the on-demand database service environment 700 via the pod 744. One or more instances of the app server 788 may be configured to execute all or a portion of the operations of the services described herein.

In some implementations, as discussed above, the pod 744 may include one or more database instances 790. A database instance 790 may be configured as an MTS in which different organizations share access to the same database, using the techniques described above. Database information may be transmitted to the indexer 794, which may provide an index of information available in the database 790 to file servers 786. The QFS 792 or other suitable filesystem may serve as a rapid-access file system for storing and accessing information available within the pod 744. The QFS 792 may support volume management capabilities, allowing many disks to be grouped together into a file system. The QFS 792 may communicate with the database instances 790, content search servers 768 and/or indexers 794 to identify, retrieve, move, and/or update data stored in the network file systems (NFS) 796 and/or other storage systems.

In some implementations, one or more query servers 782 may communicate with the NFS 796 to retrieve and/or update information stored outside of the pod 744. The NFS 796 may allow servers located in the pod 744 to access information over a network in a manner similar to how local storage is accessed. Queries from the query servers 722 may be transmitted to the NFS 796 via the load balancer 728, which may distribute resource requests over various resources available in the on-demand database service environment 700. The NFS 796 may also communicate with the QFS 792 to update the information stored on the NFS 796 and/or to provide information to the QFS 792 for use by servers located within the pod 744.

In some implementations, the content batch servers 764 may handle requests internal to the pod 744. These requests may be long-running and/or not tied to a particular customer, such as requests related to log mining, cleanup work, and maintenance tasks. The content search servers 768 may provide query and indexer functions such as functions allowing users to search through content stored in the on-demand database service environment 700. The file servers 786 may manage requests for information stored in the file storage 798, which may store information such as documents, images, basic large objects (BLOBs), etc. The query servers 782 may be used to retrieve information from one or more file systems. For example, the query system 782 may receive requests for information from the app servers 788 and then transmit information queries to the NFS 796 located outside the pod 744. The ACS servers 780 may control access to data, hardware resources, or software resources called upon to render services provided by the pod 744. The batch servers 784 may process batch jobs, which are used to run tasks at specified times. Thus, the batch servers 784 may transmit instructions to other servers, such as the app servers 788, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 8:
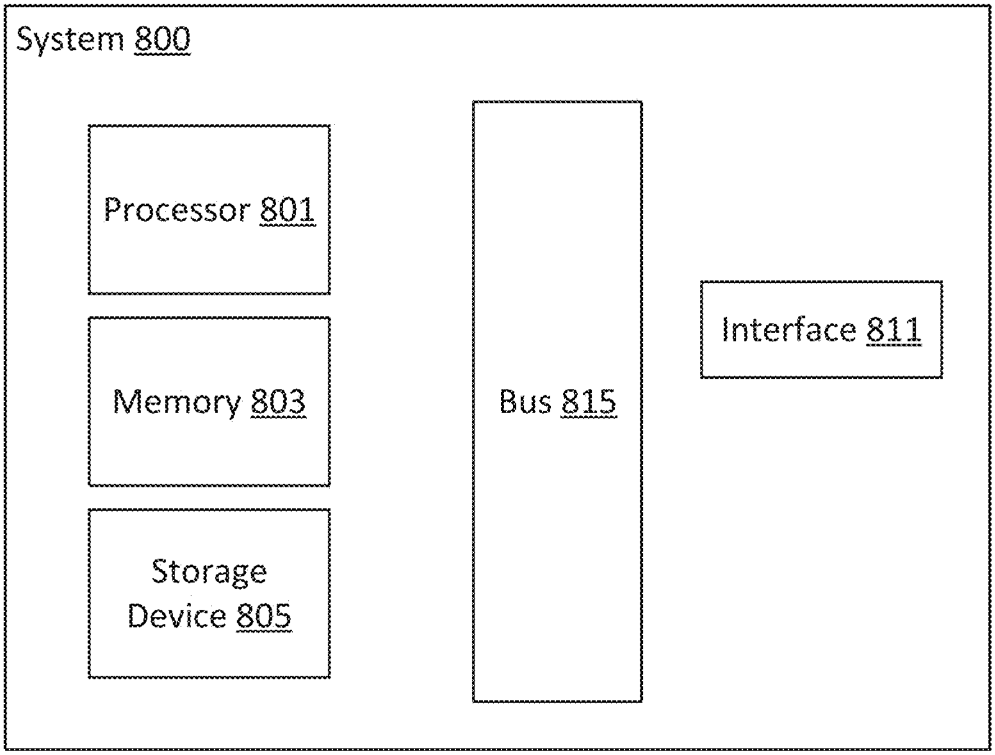
FIG. 8 illustrates one example of a computing device, configured in accordance with one or more embodiments.

FIG. 8 illustrates one example of a computing device. According to various embodiments, a system 800 suitable for implementing embodiments described herein includes a processor 801, a memory module 803, a storage device 805, an interface 811, and a bus 815 (e.g., a PCI bus or other interconnection fabric.) System 800 may operate as variety of devices such as an application server, a database server, or any other device or service described herein. Although a particular configuration is described, a variety of alternative configurations are possible. The processor 801 may perform operations such as those described herein. Instructions for performing such operations may be embodied in the memory 803, on one or more non-transitory computer readable media, or on some other storage device. Various specially configured devices can also be used in place of or in addition to the processor 801. The interface 811 may be configured to send and receive data packets over a network.

Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of multi-tenant database systems. However, the techniques disclosed herein apply to a wide variety of database systems. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A database system comprising:

an account repository storing account information for a plurality of database system accounts providing access to the database system by database users and restricting operations performed by those users within the database system, the plurality of database system accounts including a first subset of accounts corresponding with a respective plurality of human users, the plurality of database system accounts including a second subset accounts corresponding with a respective plurality of machine model users;

a communication interface providing access to a plurality of computing operations, the communication interface receiving from a remote computing device associated with a first account of the first subset of accounts a message identifying an operation of the plurality of computing operations and a machine model of the plurality of machine models to perform the operation;

a data model including operation restriction information identifying one or more restrictions regarding database system accounts authorized to perform the operation;

an operation execution engine including a hardware processor configured to execute the machine model to perform the operation upon determining, based on the one or more restrictions, that the first account is authorized to assign the operation to a second account of the second subset of accounts corresponding to the machine model; and a record repository configured to store one or more database records reflecting performance of the operation by the machine model, the one or more database records indicating that the first account assigned the operation to the second account.

2. The database system recited in claim 1, wherein the one or more restrictions include a machine model delegation restriction indicating that the operation is delegable to a machine model.

3. The database system recited in claim 1, wherein the operation corresponds to a decision within a business workflow, and wherein the one or more restrictions includes a human oversight indicating that human oversight is required for the decision.

4. The database system recited in claim 1, wherein the one or more restrictions includes an oversight restriction indicating that review of the decision is required, and wherein executing the machine model to perform the operation includes determining prospective computing operation output information.

5. The database system recited in claim 4, wherein executing the machine model to perform the operation further includes transmitting a message eliciting approval of the prospective computing operation output information.

6. The database system recited in claim 5, wherein executing the machine model to perform the operation further includes applying the prospective computing operation output within the database system upon determining that approval of the prospective computing operation output information has been received.

7. The database system recited in claim 6, wherein the message is transmitted to the remote computing device which is authenticated to the first database account, and wherein an indication of the approval is received from the remote computing device.

8. The database system recited in claim 1, wherein the one or more database records indicate that the one or more database records were created by the first account.

9. The database system recited in claim 1, wherein the one or more database records indicate that the one or more database records were last modified by the second account.

10. The database system recited in claim 1, wherein the one or more database records indicate that the one or more database records were reviewed by the first account.

11. The database system recited in claim 1, wherein the one or more database records include input information characterizing input provided to the machine model.

12. The database system recited in claim 1, wherein the database system stores correspondence information defining a correspondence between the second subset of accounts and a plurality of machine models.

13. The database system recited in claim 12, wherein the second subset of accounts includes two or more accounts that each correspond to the machine model.

14. The database system recited in claim 12, wherein the correspondence includes metadata characterizing configuration information for the machine models.

15. A method comprising:

storing account information for a plurality of database system accounts providing access to the database system by database users and restricting operations performed by those users within the database system, the plurality of database system accounts including a first subset of accounts corresponding with a respective plurality of human users, the plurality of database system accounts including a second subset accounts corresponding with a respective plurality of machine model users;

providing access to a plurality of computing operations via a communication interface, the communication interface receiving from a remote computing device associated with a first account of the first subset of accounts a message identifying an operation of the plurality of computing operations and a machine model of the plurality of machine models to perform the operation;

retrieving from a data model operation restriction information identifying one or more restrictions regarding database system accounts authorized to perform the operation;

executing the machine model to perform the operation via an operation execution engine including a hardware processor upon determining, based on the one or more restrictions, that the first account is authorized to assign the operation to a second account of the second subset of accounts corresponding to the machine model; and storing one or more database records reflecting performance of the operation by the machine model in a record repository, the one or more database records indicating that the first account assigned the operation to the second account.

16. The method recited in claim 15, wherein the one or more restrictions include a machine model delegation restriction indicating that the operation is delegable to a machine model.

17. The method recited in claim 15, wherein the operation corresponds to a decision within a business workflow, and wherein the one or more restrictions includes a human oversight indicating that human oversight is required for the decision.

18. The method recited in claim 17, wherein the one or more restrictions includes an oversight restriction indicating that review of the decision is required, and wherein executing the machine model to perform the operation includes determining prospective computing operation output information.

19. One or more non-transitory computer readable media having instructions stored thereon for performing a method, the method comprising:

storing account information for a plurality of database system accounts providing access to the database system by database users and restricting operations performed by those users within the database system, the plurality of database system accounts including a first subset of accounts corresponding with a respective plurality of human users, the plurality of database system accounts including a second subset accounts corresponding with a respective plurality of machine model users;

providing access to a plurality of computing operations via a communication interface, the communication interface receiving from a remote computing device associated with a first account of the first subset of accounts a message identifying an operation of the plurality of computing operations and a machine model of the plurality of machine models to perform the operation;

retrieving from a data model operation restriction information identifying one or more restrictions regarding database system accounts authorized to perform the operation;

executing the machine model to perform the operation via an operation execution engine including a hardware processor upon determining, based on the one or more restrictions, that the first account is authorized to assign the operation to a second account of the second subset of accounts corresponding to the machine model; and storing one or more database records reflecting performance of the operation by the machine model in a record repository, the one or more database records indicating that the first account assigned the operation to the second account.

20. The one or more non-transitory computer readable media recited in claim 19, wherein the one or more restrictions includes an oversight restriction indicating that review of the decision is required, and wherein executing the machine model to perform the operation includes determining prospective computing operation output information, wherein executing the machine model to perform the operation further includes transmitting a message eliciting approval of the prospective computing operation output information, wherein executing the machine model to perform the operation further includes applying the prospective computing operation output within the database system upon determining that approval of the prospective computing operation output information has been received, and wherein the message is transmitted to a remote computing device authenticated to the first database account, and wherein an indication of the approval is received from the remote computing device.

* * * * *